United States Patent [19]

Achille et al.

[11] Patent Number: 5,006,383
[45] Date of Patent: Apr. 9, 1991

[54] POLYMERIC BLEND AND LAMINATED STRUCTURES PREPARED THEREFROM

[75] Inventors: Felix Achille, Reynoldsburg; Brad Stevens, Frazeyburg; George Clingerman, Newark, all of Ohio

[73] Assignee: The Dow Chemical Company, Midland, Mich.

[21] Appl. No.: 372,583

[22] Filed: Jun. 28, 1989

[51] Int. Cl.$^5$ .................... B65D 25/38; B65D 43/06; B65D 25/00; B32B 15/08
[52] U.S. Cl. .................... 428/35.9; 220/355; 220/453; 428/343; 428/349; 428/461
[58] Field of Search .................... 428/35.9, 343, 349, 428/461; 220/75, 77, 303, 355, 453

[56] References Cited

U.S. PATENT DOCUMENTS

| | | | |
|---|---|---|---|
| 3,679,513 | 7/1972 | Addinall et al. | |
| 4,034,132 | 7/1977 | Manvel | |
| 4,087,587 | 5/1978 | Shida et al. | |
| 4,172,914 | 10/1979 | Festag et al. | 428/35.9 |
| 4,225,553 | 9/1980 | Hirota et al. | |
| 4,340,641 | 7/1982 | Weiner | 428/349 |
| 4,423,823 | 3/1984 | Franek et al. | |
| 4,477,501 | 10/1984 | Kojima et al. | 428/35.9 |
| 4,605,576 | 8/1986 | Jabarin | 428/349 |
| 4,613,547 | 9/1986 | Wagner, Jr. et al. | 428/349 |
| 4,626,157 | 12/1986 | Franek et al. | |
| 4,629,657 | 12/1986 | Gulati et al. | 428/461 |
| 4,692,380 | 9/1987 | Reid | 428/461 |
| 4,720,427 | 1/1988 | Clauson et al. | 428/349 |
| 4,734,303 | 3/1988 | Fujiwara et al. | |
| 4,830,918 | 5/1989 | Schinkel et al. | 428/349 |

*Primary Examiner*—James J. Seidleck
*Attorney, Agent, or Firm*—Douglas N. Deline

[57] ABSTRACT

A polymeric blend comprising a polypropylene resin and very low density polyethylene are particularly suited for preparation of films which are readily adhered to metal surfaces. Sheet metal laminates according to the foregoing design are usefully employed in the manufacture of components for aerosol containers.

26 Claims, No Drawings

POLYMERIC BLEND AND LAMINATED STRUCTURES PREPARED THEREFROM

BACKGROUND OF THE INVENTION

The present invention relates to a polymeric blend having improved properties and particularly suited for the use in the preparation of films. More particularly the present invention relates to such a polymeric blend having improved melt strength and particularly adapted to the preparation of blown films which may subsequently be laminated to metal substrates.

In U.S. Pat. No. 4,626,157 there are disclosed metal containers especially aerosol dispensing containers containing top can end members and valve cup members formed from a metal sheet material comprising a thin polymeric layer overlaid on the metallic substrate. Particularly suitable polymeric materials include polyesters and polypropylene (col. 4, lines 30-32). In U.S. Pat. No. 4,423,823 a similar metal can is disclosed wherein at least one component thereof is comprised of a metal sheet containing a laminate of polypropylene which is cast thereon.

In U.S. Pat. No. 4,034,132 a carboxyl modified polypropylene resin is proposed for adhering to enamel coated metal substrates.

In U.S. Pat. No. 4,686,152 a metal packaging foil comprising an iron foil and a polymeric resin coating is disclosed. Suitable polymeric resins including polypropylene, polyethylene, polybutene-1, a propylene/ethylene copolymer, etc. are disclosed at columns 11 and 12.

In U.S. Pat. No. 4,734,303 a laminate comprising an iron or steel foil having a plastic film layer adhered thereto with an adhesive force of at least 600 grams/15 millimeters of width is disclosed. The list of suitable films are those previously disclosed in 4,636,152 and are adhered by the use of an adhesive resin including isocyanate type and epoxy type adhesives (col. 10, lines 30-34).

In U.S. Pat. No. 4,361,020 a metal substrate having a plastic film adhered thereto is employed to prepare cold formed objects. Suitable plastics include oriented or nonoriented polyethylene terephthalate, polyimide resins, polypropylene, polycarbonate, and blends.

For the teachings contained therein the foregoing United States patents are incorporated in their entirety by reference thereto.

Highly desirable resin films comprising polypropylene or modified polypropylene are employed in the foregoing laminated structures due to the inherent chemical resistance of such resins. Disadvantageously however, presently available polypropylene and modified polypropylene resins are not well suited for the preparation of films, particularly by the use of the blown film technique. The alternative of employing casting technology to prepare such films does not readily permit the use of randomizing procedures to prepare a film of uniform gauge that is free of defects. Consequently, laminates prepared utilizing cast films of polypropylene may possess undesirable variations of thickness or other defects which may render such laminates unsuited for the intended use. In the formation of sealed metal containers as disclosed in certain of the foregoing prior art references, it is highly desirable to provide a film of uniform dimension such as may be prepared by the blown film technique.

The blown film technique involves use of air to expand a molten bubble of polymer. The technique is well known in the art and taught in U.S. Pat. Nos. 3,650,649, 3,801,429 and 3,354,506, the teachings of which are incorporated herein by reference thereto. Polypropylene resins have also been found to be particularly difficult to adhere to various metallic substrates particularly by the use of thermoplastic adhesive resins. Various commercial embodiments of the foregoing laminates and structures comprising such laminates have utilized solvent born adhesives such as lacquers to laminate the cast polypropylene film to the metallic substrate. The use of such solvent-based adhesives involves unnecessary complexity in the preparation of laminates and is undesirable from the standpoint of environmental degradation due to solvent emissions.

It would be desirable if there were provided an improved polypropylene containing resin for use in the preparation of laminated structures Furthermore it would be desirable if there were provided such a resin having improved melt strength thereby allowing its use in the preparation of blown films therefrom without the loss of solvent resistance and other resin properties normally attributable to polypropylene resins.

It would additionally be desirable if there were provided a polypropylene containing resin having improved compatibility with thermoplastic adhesive resins for use in the preparation of laminated structures comprising a layer of such polypropylene containing resin and a layer of thermoplastic adhesive resin.

Finally it would be desirable if there were provided an improved metallic laminate containing a metallic substrate having laminated thereto an improved polypropylene based resin which could be readily formed into components for containers.

SUMMARY OF THE INVENTION

According to the present invention there is provided a polymeric resin blend suitable for the formation of films comprising a polypropylene resin and very low density polyethylene having a density from 0.88 to 0.92.

In a further embodiment of the present invention there is provided a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, preferably 6-20 lbs/lineal in.

In an additional embodiment of the present invention there is provided a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in (preferably 6 to 20 lbs/lineal in), the polymeric film structure being adhered to the metal layer by means of surface contact between the remaining surface of the adhesive layer and the metal layer with an adhesive strength of at least 6 lbs/in.

In still another embodiment of the present invention there is provided a laminated metal structure having both sides coated by a polymer film, at least one such film being the above described polypropylene containing structure. Accordingly there is provided a laminated metal structure comprising a flat metal sheet having two major surfaces, adhered to one major surface is a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in (preferably 6 to 20 lbs/lineal in, the polymeric film structure being adhered to the flat metal sheet by means of surface contact between the remaining surface of the adhesive layer and the metal sheet with an adhesive force of at least 6 lbs/in: and adhered to the second major surface of the flat metal sheet is a film of a thermoplastic resin. Preferably the thermoplastic resin film comprises a first layer of a homopolymer or copolymer of an α-olefin or a blend of more than one such homopolymer or copolymer, and an adhesive layer comprising an adhesive resin, the thermoplastic resin film structure being disposed so as to provide surface contact between the second major surface of the flat metal sheet and the adhesive layer of the thermoplastic resin film structure.

In a final embodiment of the present invention there is provided an article of manufacture which is a metal container at least one component of which is formed from a metal sheet having at least one side thereof laminated with a polymeric film structure comprising a first layer comprising a blend of a polypropylene resin and very low density polyethylene having a density from 0.88 to 0.92, and an adhesive layer comprising an adhesive resin, said first layers and adhesive layers being adhered to one another by means of surface contact between major surfaces of the respective layers with an adhesive strength of from 1 to 24 lbs/lineal in, preferably 6 to 20 lbs/lineal in.

DETAILED DESCRIPTION

Polypropylene resins suitably employed in the preparation of a polymeric blend according to the present invention include homopolymers of propylene, copolymers of propylene and a copolymerizable comonomer, and chemically modified derivatives thereof. Examples of chemically modified polypropylenes include the maleic anhydride grafted polypropylenes disclosed in U.S. Pat. No. 4,034,132. Preferred polypropylenes are amorphous homopolymers of propylene having a density from 0.85 to 0.95, and melt index from 1.0 to 6.0. Most preferred are such homopolymers having a density of 0.90 and a melt index from 2.0 to 5.0.

Very low density polyethylene may be prepared by the Ziegler-Natta catalyzed polymerization of ethylene and a copolymerizable c-olefin comonomer. Preferred ultra low density linear polyethylenes have densities from 0.89 to 0.915, most preferably from 0.9 to 0.912 and a melt index from 0.8 to 3.0. A particularly preferred very low density polyethylene resin for use according to the present invention is available under the tradename Attane ® from The Dow Chemical Company.

The amount of polypropylene resin in the blend is suitably from 20 percent to 80 percent by weight, more preferably from 25 to 65 percent by weight and most preferably from 40 percent to 60 percent by weight. Conversely the amount of very low density polyethylene in the blend is preferably from 80 percent to 20 percent by weight, more preferably from 75 percent to 35 percent by weight and most preferably from 60 to 40 percent by weight. Additional resinous components as well as inert additives such as pigments may be incorporated into the resin blend as long as the resultant composition retains the physical properties required according to the present invention. The resulting resin blend is suitably melt extruded and formed into films by the use of extrusion coating, blown film, or cast film techniques all of which are well known in the prior art. Orientation in one or two directions in the film may be imparted in order to improve strength characteristics thereof as is well known in the art. Preferably the films prepared from the above polymeric blend have a thickness from 0.0005 to 0.02 inches (0.0126 to 0.50 mm), preferably from 0.001 to 0.01 inches (0.025 to 0.25 mm).

A preferred embodiment according to the present invention is a multilayer film comprising one layer of the above described polymeric blend and a second layer of an adhesive resin. Such multilayer polymeric film structures may be easily prepared by the use of coextrusion techniques and expansion of such film may be effected by tentering or bubble expansion techniques. In a further embodiment there may be provided a third layer between the polypropylene polymeric blend layer and the adhesive layer for the incorporation of pigments, scrap and recycle resin if desired.

The preferred adhesive resin for use in the preparation of the polymeric film structure is a rubber and polar comonomer modified α-olefin polymer resin. Particularly preferred are dicarboxylic acid anhydride modified polyethylene, polypropylene or ethylene vinyl acetate copolymer resins, and rubber modified derivatives thereof. The resin may be modified by copolymerization or graft copolymerization techniques employing an ethylenically unsaturated dicarboxylic acid anhydride or anhydride precursor such as succinic anhydride or maleic anhydride. Techniques for the preparation of suitable adhesive resins are disclosed in U.S. Pat. No. 3,928,497, and 4,584,348 the teachings of which are incorporated herein by reference. Highly preferred adhesive resins for use according to the present invention include Plexar ™ 6 available from Quantum Chemical Corp., and Admer VE 300 available from Mitsui Chemical Company.

The polymeric film usefully employed according to the present invention preferably has a polypropylene resin blend layer comprising from 95 percent to 50 percent, most preferably from 90 percent to 75 percent of the film thickness and an adhesive resin content from 5 percent to 50 percent, most preferably from 10 percent to 25 percent of the film thickness. Preferably the average thickness of the resulting coextruded film is from 0.001 to 0.020 inches (0.025 to 0.51 mm), most preferably from 0.005 to 0.012 inches (0.13 to 0.3 mm).

It has been discovered that films incorporating only high density polyethylene are often deficient in elongation and toughness such that substrates formed by adhesion of such films to metal sheet materials can experience buckling or puckering of the film on interior curved surfaces when formed into aerosol valve mounting cups. Conversely films containing only low density polyethylene are both difficult to produce, and forming and cutting of such films can lead to "stringing", due to the excessive elongation of such resins. The resin blend utilized according to the present invention suitably meets the requirements of elongation and toughness required for subsequent forming operations of metal laminates containing such films and does not result in stringing of the resin on cutting or shearing thereof.

Lamination of the above disclosed polymeric film to a metallic substrate is readily effected by contacting the film structure with the adhesive layer thereof in contact with the metallic substrate optionally at an elevated temperature and with concurrent application of pressure. In a desirable embodiment the metallic substrate is in the form of a flat metal sheet having two major surfaces and the polymeric film is contacted with the sheet in a continuous manner by passing the same through heated rolls. The resulting flat coated metallic sheet may be formed into any desired shape by cutting and stamping or otherwise forming the same.

The sheet metal employed in the present laminate is preferably selected from the group consisting of tin free steel, tin plate steel, galvanized steel, high strength low alloy steel, stainless steel, copper-plated steel, copper, aluminum, etc. A preferred metallic substrate is tin plate steel or tin free steel.

The metal-plastic laminates prepared according to the present invention are suitably employed in the preparation of aerosol containers, particularly in the preparation of valve cups and aerosol can domes and bottoms where pressure sealing is obtained by forming a crimped edge with the polymeric layer tightly engaged between two layers of steel sheet. In addition the laminated structure may be employed in the preparation of other containers where a chemical, corrosion and pressure resistant seal is desired. Furthermore, in the manufacture of metal paint cans the bottom of such cans may be stamped and formed from the foregoing metal plastic laminate and joined to the cylindrical sides of the can by formation of a crimped seal. The resulting seam is impervious to solvents and other chemicals shipped in the container and maintains a leak-proof seal. Formation of such metal cans utilizing components formed from the present metal-plastic laminate eliminates the need for separate application of a gasketing material such as an isoprene rubber around the perimeter of a circular-shaped blank and the curing thereof with its concomitant solvent emissions. Utilizing coated metals according to the present invention streamlines the metal paint can manufacturing process, resulting in improved efficiency.

A further embodiment of the present invention involves a laminated metal structure according to the previous teachings having additionally applied to the remaining major surface of the metal sheet a thermoplastic film layer to provide both corrosion protection and optional pigmenting. Sealing of containers formed from such plastic/metal/plastic laminate is achieved by means of the polypropylene blend containing laminate as previously disclosed in either a mechanically crimped seal or an adhesively joined seal as is well known in the art. The remaining laminate forms the surface of the resulting container. Such a laminate is particularly desirable for use in the preparation of aerosol containers for use in packaging of corrosive ingredients such as oven cleaners, detergent formulations, and other cleaning products. For example valve cups or aerosol can domes and bottoms formed from a composition having adhered to the inner surface thereof a polymeric blend comprising a polypropylene resin and having adhered to the outer surface a thermoplastic resin layer achieve good pressure resistant sealing by means of crimped joints formed between the edges of the valve cup or top and the aerosol can sides. In addition substantially reduced corrosion of the valve cup and container top resulting from contact with the container's products is observed. This improvement in corrosion resistance is due to the fact that other coatings such as epoxy or enamel coatings often crack, chip or otherwise fail during the aerosol can forming process allowing exposure of the metal surface to occur.

A most preferred thermoplastic film comprises a first layer of a blend of from 30 to 70 percent by weight high density polyethylene having a density from 0.94 to 0.97 and from 70 to 30 percent by weight low density polyethylene having a density from 0.88 to 0.92. Preferred are blends from about 40 to 60 percent by weight high density polyethylene and from 60 to 40 percent low density polyethylene.

The above thermoplastic film is adhered to the metal substrate by means of an adhesive resin layer. Suitably the adhesive resin layer comprises a copolymer of ethylene and a polar comonomer, and optionally a rubber. Suitable polar comonomers include carboxylic acids, such as acrylic and methacrylic acid: vinyl acetate: esters of carboxylic acids: metal salt neutralized derivatives of carboxylic acids; and dicarboxylic acid anhydrides. Suitably the polar comonomer is copolymerized with ethylene or graft copolymerized with an ethylene containing polymer and is incorporated in an amount from about 1 percent to about 25 percent based on total adhesive polymer weight. A particularly preferred adhesive resin comprises Plexar TM 6, available from Quantum Chemical Corp.

Suitably the above thermoplastic film containing an adhesive layer is also formed according to the previously mentioned cast or blown film coextrusion techniques. Suitably the thermoplastic polymer layer comprises from about 95 percent to about 50 percent of the total film thickness, preferably from 90 percent to about 75 percent and the remainder comprises the adhesive resin layer. In another embodiment of the present invention a third layer may be interposed between the thermoplastic layer and the adhesive resin layer. Pigments and recycle or scrap resin may be incorporated into the coextruded film layers or form the inner layer. Desirably the inner layer does not result in degradation of film properties.

Preferably the thermoplastic film structure has a thickness from 0.0005 to 0.010 inch (0.01 to 0.25 mm), most preferably from 0.001 to 0.005 inch (0.001 to 0.1 mm).

By incorporating pigments in the thermoplastic film especially in an interposed layer between the adhesive resin layer and the thermoplastic resin layer a colored, coated metallic sheet may be provided. Such sheet materials are usefully employed in preparing containers having desirable aesthetic appearance and provide an improved surface for application of lettering or graphics. Such materials are particularly well suited in the preparation of aerosol containers and other containers where uncoated metal surfaces are undesired.

Two-side coated metal laminates according to the present invention may suitably be employed in the preparation of containers such as paint pails having a rolled metal tongue and groove seal for resealing the lid and container. Parts formed from the foregoing thermoplastic film coated metals may overcome the problems of scratching and flaking of enamel and epoxy coatings which results in a loss of aesthetic properties, contamination of the product and work place and corrosion of the underlying metal surface. In addition it has been discovered that metal containers incorporating a top having a tongue and groove sealing mechanism having a thermoplastic film adhered to the exposed tongue and groove mating surfaces achieve an improved mechanical seal between the lid and container. In addition reduced corrosion of the underlying metal can is also observed, resulting in reduced contamination of the product and reduced seizing of the container lid when reopened. Moreover paint which may adhere to the rim of the metal container is more easily separated from the thermoplastic film than from the metal surfaces themselves. Thus metal containers comprising a metal lid fastened by means of a formed tongue and groove fastening means designed for frictional engagement to the remainder of the container are improved by incorporation of a thermoplastic film surface layer on the mating surfaces of the tongue or lip of the lid and the grooved body of the container.

Having described the invention the following examples are provided as further illustrative and are not to be construed as limiting. Where provided percents and parts are based on weight.

EXAMPLE 1

(A) A polypropylene containing two-layer coextruded film was prepared having a layer thickness ratio of 85:15. The first layer (85%) comprised a blend of 60 percent polypropylene (Melt Index (MI)=4.0, Density =0.90) and 40 percent very low density polyethylene (MI=1.0, Density =0.912). The second layer (15%) comprised 100 percent Plexas ™ 6 adhesive resin available from Quantum Chemical Corp. The coextruded films were made on a blown film line and had an average thickness of 0.0065 inch (0.165 mm) (referred to as A-1) and 0.008 inches (0.2 mm) (referred to as A-2).

(B) A thermoplastic two-layer coextruded film having a layer thickness ratio of 85:15 was prepared. The first layer (85%) comprised a blend of 60 percent by weight high density polyethylene (MI=3.0, Density =0.96) and 40 percent by weight very low density polyethylene (MI=1.0, Density =0.912). The second layer (15%) comprised 100 percent of an anhydride modified polyethylene resin (Plexas ™ 6 adhesive resin available from Quantum Chemical Corp.). The coextruded film was made on a blown film line and had an average thickness of 0.0015 inches (0.04 mm) (B-1).

A continuous laminating line was used to laminate the foregoing plastic film onto opposite sides of tin free steel and tin plate steel sheets (~0.010 inch, ~0.25 mm thick). The laminates resulting from adhesion of the film to the metal substrates were slit to the desired width, stamp cut to the desired size, and formed into aerosol valve mounting cups with the polypropylene film o the inner surface on a progressive die. The cups were incorporated into aerosol cans by formation of a rolled edge seal and filled with a simulated cleaning product and pressurized with inert gas. Gasketing performance at room temperature and at elevated temperatures (120° F.) (49° C.) in upright and inverted positions were determined. Results are given in Table I.

TABLE I

GASKETING PERFORMANCE OF AEROSOL VALVE MOUNTING CUPS TWO WEEKS OVEN AGING AT 120° F.

| Run | Metal Substrate | Film | % Weight Change 25° C. | | % Weight Change 49° C. | |
|---|---|---|---|---|---|---|
| | | | Upright | Inverted | Upright | Inverted |
| 1 | TFS[1] | A-1 | 0.045 | 0.030 | 0.090 | 0.086 |
| 2 | TPS[2] | A-2 | 0.030 | 0.037 | 0.085 | 0.089 |
| 3 | TPS | A-2 | 0.035 | 0.037 | 0.070 | 0.10 |

[1] Tin free steel
[2] Tin plate steel

The above results indicate satisfactory sealing of the aerosol container through use of a gasketing film laminate according to the present invention.

Chemical resistance of laminates A-1 and A-2 was determined by soaking samples of the same in methylene chloride solvent for 30 days at room temperature. No change in laminate interlayer adhesion or plastic-metal adhesion was observed.

EXAMPLE 2

A paint can is prepared by stamping a rim and lid (plug) from the metal-plastic laminate B-1. The rim is assembled with side walls and a bottom such that the plastic coated groove of the rim is exposed to receive the formed tongue of the plug. The mating surface of the plug also contains an exposed thermoplastic film layer B-1. The top is then placed onto the pail and pressed into place. The structure demonstrates improved sealing ability.

We claim:

1. A polymeric film structure comprising a first layer comprising a blend of from 40 to 60 weight percent polypropylene resin and 60 to 40 weight percent very low density polyethylene having a density from 0.88 to 0.92, and a rubber and polar comonomer modified α-olefin polymer layer comprising an adhesive resin, said first layer and adhesive layer being adhered to one another by means of surface contact between major surfaces of the respective layers with an adhesive strength of from 1 to 24 lbs/lineal in.

2. A polymeric film according to claim 1 wherein the polypropylene resin is a homopolymer of propylene.

3. A polymeric film according to claim 1 wherein the very low density polyethylene has a density from 0.89 to 0.915.

4. A polymeric film according to claim 1 wherein the very low density polyethylene has a density from 0.9 to 0.912.

5. A polymeric film according to claim 1 wherein the adhesive resin is a rubber containing, ethylenically unsaturated dicarboxylic acid anhydride modified polyethylene or ethylene vinyl acetate copolymer.

6. A polymeric film according to claim 2 wherein the polypropylene resin layer comprises from 95 to 50 percent by weight of the film, and the adhesive resin layer comprises from 5 to 50 percent by weight.

7. A polymeric film according to claim 2 prepared by the blown film technique.

8. A laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of a least 6 lbs/in.

9. A laminated metal structure according to claim 8 wherein the polypropylene resin is a homopolymer of propylene.

10. A laminated metal structure according to claim 8 wherein the very low density polyethylene has a density from 0.89 to 0.915.

11. A laminated metal structure according to claim 8 wherein the very low density polyethylene has a density from 0.9 to 0.912.

12. A laminated metal structure according to claim 8 comprising from 20 to 80 percent by weight polypropylene resin and from 80 to 20 percent by weight very low density polyethylene.

13. A laminated metal structure according to claim 12 comprising from 40 to 60 percent by weight polypropylene resin and 60 to 40 percent by weight very low density polyethylene.

14. A laminated metal structure according to claim 8 wherein the adhesive resin is a rubber and polar comonomer modified α-olefin polymer resin.

15. A laminated metal structure according to claim 14 wherein the adhesive resin is a rubber containing, ethylenically unsaturated dicarboxylic acid anhydride modified polyethylene or ethylene vinyl acetate copolymer.

16. A laminated metal structure according to claim 8 wherein the polypropylene resin layer comprises from 95 to 50 percent by weight of the film, and the adhesive re in layer comprises from 5 to 50.

17. A laminated metal structure according to claim 8 wherein the polymeric film is prepared by the blown film technique.

18. A laminated metal sheet structure according to claim 8 having adhered to one major surface thereof the polymer film structure and adhered to the opposite major surface thereof a film of a thermoplastic resin.

19. A laminated metal sheet structure according to claim 18 wherein the film of a thermoplastic resin adhered to the opposite major surface is a homopolymer of an α-olefin, a copolymer of an α-olefin and a copolymerizable comonomer, or a blend thereof.

20. In a sheet metal container comprising walls, top and bottom sheet metal components joined together by mechanically crimped seams, the improvement wherein at least one such container component is formed from a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in.

21. In a sheet metal container comprising wall, top and bottom sheet metal components joined together by mechanically crimped seams, the improvement wherein at least one such container component is formed from a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in and adhered to the opposite major metal surface a film of a thermoplastic resin.

22. The sheet metal container according to claims 20 or 21 in the form of an aerosol container.

23. In an aerosol container comprising a tubular central portion, bottom and top, the top further comprising a valve cup mechanically attached to the top by means of a crimped sheet metal seal, the improvement wherein the valve cup is formed from a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in.

24. In an aerosol container comprising a tubular central portion, bottom and top, the top further comprising a valve cup mechanically attached to the top by means of a crimped sheet metal seal, the improvement wherein the valve cup is formed from a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in and adhered to the opposite major metal surface a film of a thermoplastic resin.

25. In a sheet metal container having a resealable lid comprising a formed metal lip on the circumference thereof, said lip engaging a formed groove in the top of said container, the improvement wherein the mating surface of the lip and groove are formed of a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in.

26. In a sheet metal container having a resealable lid comprising a formed metal lip on the circumference thereof, said lip engaging a formed groove in the top of said container, the improvement wherein the mating surfaces of the lip and groove are formed of a laminated metal structure comprising a metal layer having adhered to at least one major surface thereof a polymeric film structure comprising a first layer comprising a blend of a polypropylene resin and very low density polyethylene having a density from 0.88 to 0.92, and an adhesive layer comprising an adhesive resin, said first layer and adhesive layer being adhered to one another by means of surface contact between major surfaces of the respective layers with an adhesive strength of from 1 to 24 lbs/lineal in, the polymeric film structure being adhered to the metal layer by means of surface contact between the remaining surface of the adhesive layer and the metal layer with an adhesive strength of at least 6 lbs/in and adhered to the opposite major metal surface a film of a thermoplastic resin.

* * * * *

UNITED STATES PATENT AND TRADEMARK OFFICE
CERTIFICATE OF CORRECTION

PATENT NO. : 5,006,383

DATED : April 9, 1991

INVENTOR(S) : Felix Achille et al.

It is certified that error appears in the above-identified patent and that said Letters Patent is hereby corrected as shown below:

Column 8, line 36, following "and" insert --an adhesive layer comprising--.

Column 8, line 37, delete "layer comprising an adhesive".

Column 9, line 33, "re in" should correctly read --resin--.

Column 9, line 46, "walls" should correctly read --wall--.

Column 10, line 59, "surface" should correctly read --surfaces--.

Signed and Sealed this

Sixth Day of October, 1992

Attest:

DOUGLAS B. COMER

*Attesting Officer*   *Acting Commissioner of Patents and Trademarks*